L. J. VAN GUELPEN.
BURNISHING MACHINE.
APPLICATION FILED NOV. 3, 1919.

1,423,051.

Patented July 18, 1922.
6 SHEETS—SHEET 1.

FIG. 1.

INVENTOR.
Louis J. Van Guelpen
By John W. Diehl
ATTORNEY.

L. J. VAN GUELPEN.
BURNISHING MACHINE.
APPLICATION FILED NOV. 3, 1919.

1,423,051.

Patented July 18, 1922.
6 SHEETS—SHEET 2.

L. J. VAN GUELPEN.
BURNISHING MACHINE.
APPLICATION FILED NOV. 3, 1919.

1,423,051.

Patented July 18, 1922.

INVENTOR
Louis J. Van Guelpen
by John W. Streeter
ATTORNEY.

UNITED STATES PATENT OFFICE.

LOUIS J. VAN GUELPEN, OF CINCINNATI, OHIO.

BURNISHING MACHINE.

1,423,051.   Specification of Letters Patent.   Patented July 18, 1922.

Application filed November 3, 1919. Serial No. 335,516.

*To all whom it may concern:*

Be it known that I, LOUIS J. VAN GUELPEN, a citizen of the United States, residing at the city of Cincinnati, in the county of Hamilton and State of Ohio, have invented certain new and useful Improvements in Burnishing Machines, of which the following is a specification.

The object of my invention is to produce a machine for burnishing the edges of material of varying shape, size and contour. For example, the vamps of shoes are made of leather of varying thicknesses, of different colors and of many different outlines and contour. In burnishing such material at its edges, I usually employ a rapidly revolving burnishing tool, generally provided with a peripheral groove, recess or slot, the tool being heated preferably by electricity. One form of such a machine is shown in my Patent No. 1,227,221, dated May 22, 1917, and a preferable form of tool employed is shown in my patent No. 1,253,650, dated January 15, 1918.

The main features of this invention consist in the feeding mechanism and the guiding mechanism; the feeding mechanism for feeding the leather or other material to be burnished at its edge, to the burnishing tool and the guide mechanism for guiding the material as it is being burnished so that its edge will travel against the heated revolving spindle, (which is the burnishing tool in this machine), so that said material will not buckle or crowd against the tool or grooves therein; but be forced to travel in a controlled course.

In the accompanying drawing, forming part of this specification:

Fig. 6, is a front view of parts as shown in Fig. 5, Fig. 7, is a plan view, taken on lines 7—7 of Fig. 6, Fig. 8, is a plan view of the lower guide mechanism and its levers, Fig. 9, is an elevation of the lower guide mechanism, without its levers, Fig. 12, is a section on line 12—12 of Fig. 8, Fig. 13, is a view approximately similar to view in Fig. 3, the sleeve mechanism and its guide pin being however, raised or in normal position, the lever however, being left off in this view.

The base of the machine is marked 1 and it carries at one end an upwardly and forwardly extending arm 2, and at its forward end carries a protecting cap 3, held in position by screws 4, so that it can be removed. A door 5 is provided in the arm, so that the inside of said arm can be reached. To the arm 2, under the forward part of protecting cap 3, I connect a bearing piece 6, notched to form a screw seat for screw 7.

Figures 17, 18:
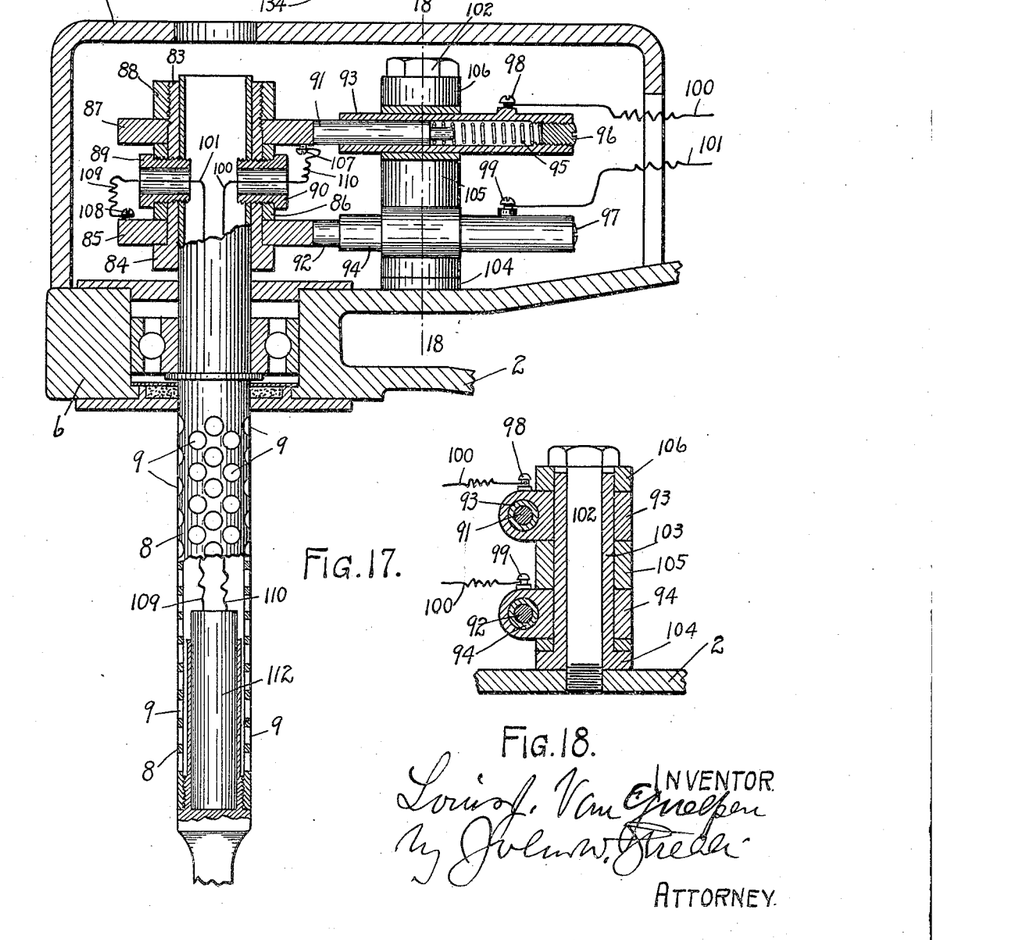
Fig. 17, is a sectional view of the upper part of the arm, parts of the spindle and contact fixtures partly in section and partly in elevation.
Fig. 18, is a sectional view of the brush holders, taken on the line 18—18, of Fig. 17.

The burnishing tool of the machine is marked 8 and fits into and is connected with ball bearings, one set of bearings in the bearing piece 6 and the other inside the base 1, below the tool 8, these bearings not shown except in Fig. 17. This tool is provided with perforations 9 and peripheral grooves 10, in the present instance, three in number, two being seen.

I may use any kind or form of burnishing tool, but prefer to use the one herein shown.

Figure 14:
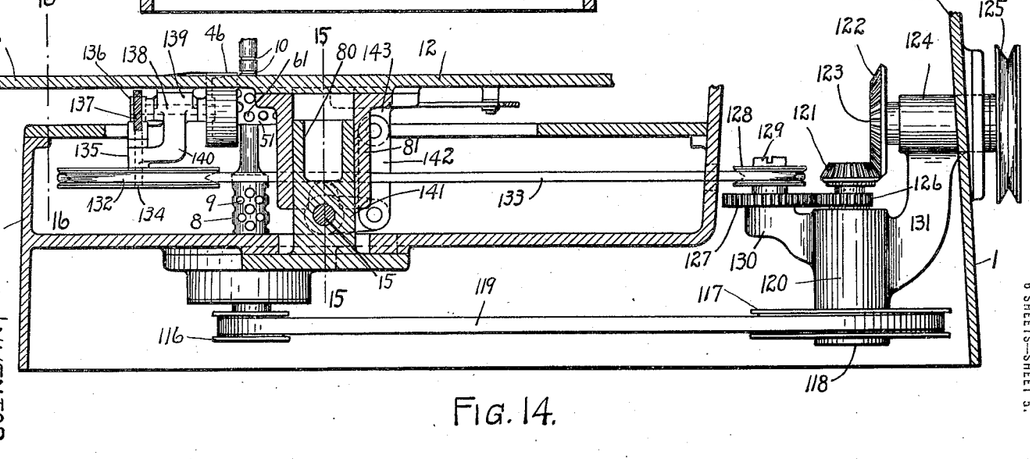
Fig. 14, is a sectional view of the lower part of the machine, showing the driving mechanism.
Figure 15:
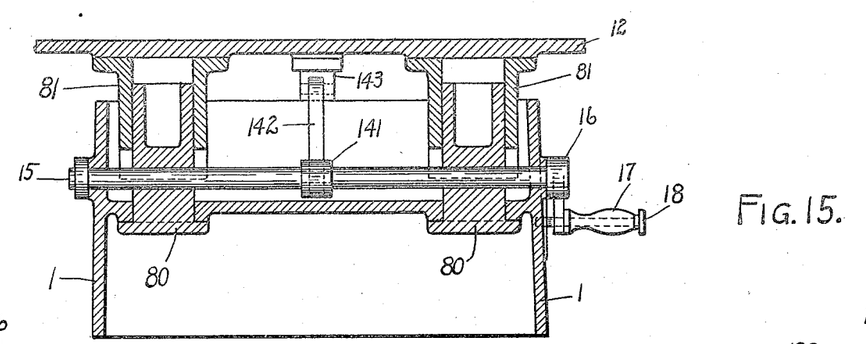
Fig. 15, is a sectional view on the line 15—15, showing the plate elevating mechanism.
Figure 16:
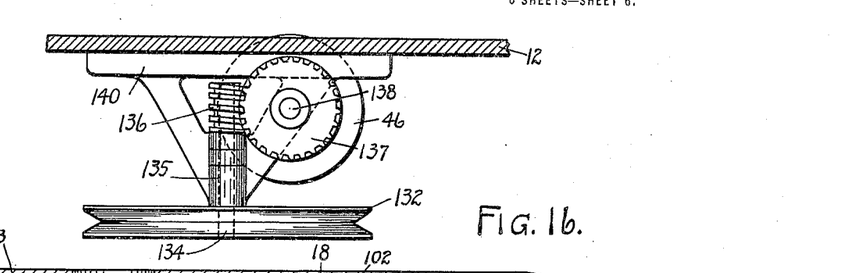
Fig. 16, is a view in elevation, with the feed plate in section, taken on line 16—16 of Fig. 14, and being the feed driving mechanism.

The burnishing tool 8 passes through a hole in the plate 12. This plate 12 is known as a feed plate and moves up and down on slide posts 80, which operate in sleeves 81 (see particularly Figs. 14 and 15); the sleeves 81 are rigidly attached to the plate 12, underneath thereof, and the posts 80 are rigidly attached to the inside of base 7. This plate is circular in form and carries an extension 13. On this extension 13, I place an upwardly and forwardly extending arm 14, rigidly attached to the plate 12 and moving up and down therewith. The plate is moved up and down as follows: A shaft 15 extends through the base 1 and bears in the slide posts 80 above referred to which are inside the base. To the end of shaft 15, I attach a lever 16 provided with handle 17; through this handle I place a centering and locking pin 18, which registers with holes 19 in the side of base 1. By pulling out this locking pin 18 the handle can be moved up and down and this movement effects shaft 15, which operates the mechanism on the inside of base 1, together with the sleeves 81, to move the plate 12 up and down; when the desired height is reached the locking pin enters one of the holes 19 and locks the plate at this height. This up and down movement of plate 12 is necessary on account of the desirability of burnishing the edges of materials of varying and different thicknesses and by this up and down movement the proper registry is provided with one of the grooves 10, in order to properly burnish the edge of the material being worked upon.

At the forward part of the arm 14, I provide a bracket 20, provided with two bracket arms 21 and 22. At its forward end, arm 14 has a downwardly extending arm 23 to which I attach an auxiliary arm 24 provided with a cam race 25. In the arms 21 and 22 I support a shaft $25^1$, carrying at its lower extremity head or block 26. This head carries a fork 27 which will be hereafter described. This block also carries a stud 28, which passes into and through cam race 25 and also through a cam roller 29, which operates in the cam race. At the top the shaft $25^1$ is provided with a removable spool 30 into the web of which fits the forked end of a lever 31 fulcrumed at 32 on arm 14; this lever extends backward and downward, terminating in a finger hold 33. On the shaft $25^1$, I place a collar 34 and between this collar and the lower face of the bracket arm 21, and around the shaft, I place a spring 35.

In the bracket arms 21 and 22, I also carry and support a shaft 36 which operates up and down and revolves loosely in said bracket arms. At the lower end of the shaft 36, I connect a presser foot, presser wheel or disc 37. The fork 27 passes in a groove on each side of the hub 38 of the presser wheel 37. To the forward end of the fork 27, I attach a guide arm 39 having a foot 40. The bracket 20 is pivoted at 45 to forward extension 23 on arm 14.

Figures 5, 6, 7:
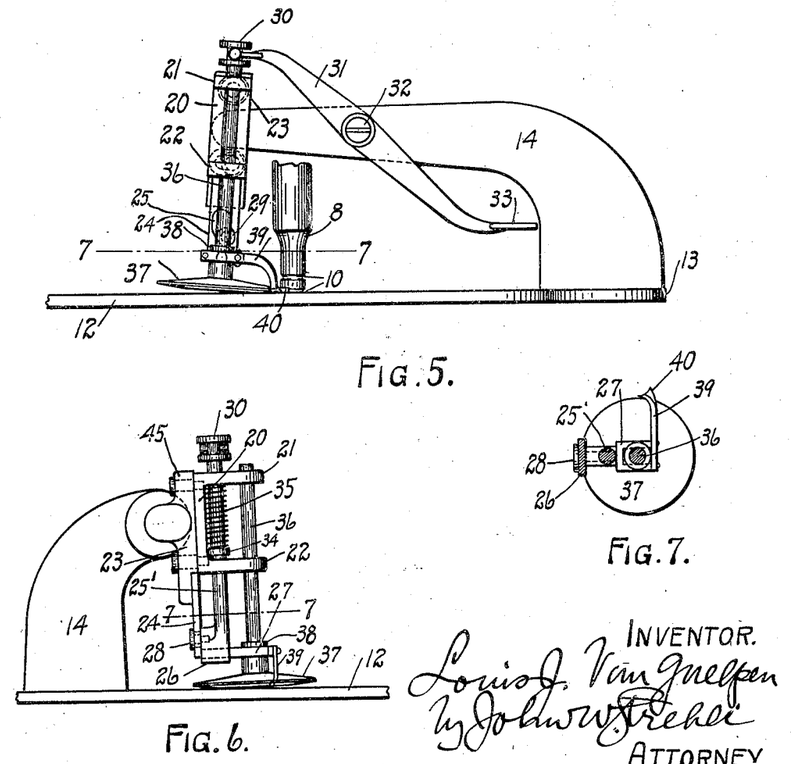
Figures 8, 9:
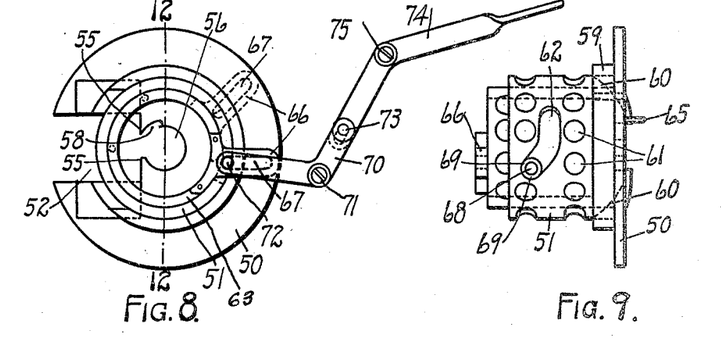
Figure 10:
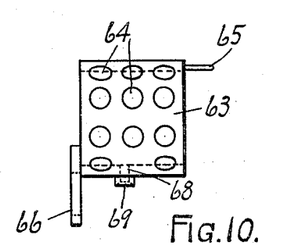
Fig. 10, is an elevation of the inner sleeve of the lower guide mechanism.
Figure 11:
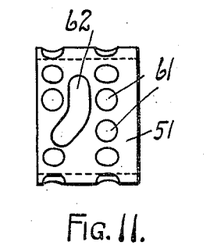
Fig. 11, is a view in elevation of the outer sleeve of lower guide mechanism.
Figure 12:
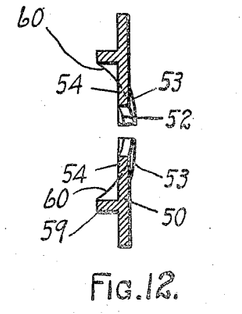
Figure 13:
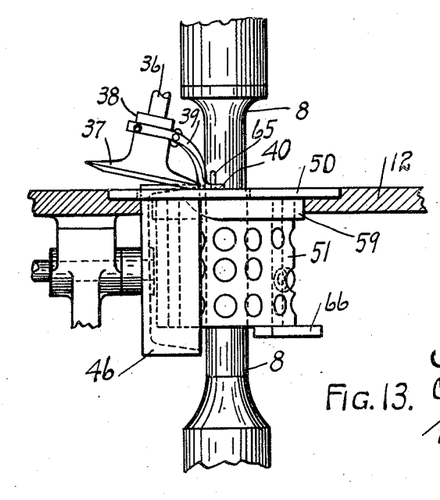

The shaft $25^1$ and its parts, and the shaft 36 carrying the presser wheel 37, are moved up and down by manipulating the lever 31, and by reason of the cam 29 passing over the cam race 25, the parts just set forth are moved up and down, also moving outwardly and inwardly together with the bracket 20, on the pivotal point 45, more particularly, first moving upwardly, then outward, and then again upwardly; in the downward movement, first going downwardly, then inwardly and then downwardly, the peculiar shape of the cam permitting this movement. These parts, which have just been described as swinging or moving in and out and up and down, are set at an incline or angle as shown in Figs. 5 and 6, and they form the pressure device for pressing down the material onto the wheel 46.

It will be noticed that the presser foot mechanism is above and attached to the feed plate. I will now describe the feed mechanism employed below the feed plate. In connection with the above mechanism, just described, I provide a bearing or supporting flanged sleeve, composed of flange 50 and sleeve 51, suitably united together; the flange 50 is screwed to the plate 12 and lies flush therewith except at the point 52 which is recessed, and at this point the feed wheel or roller 46 extends above the upper face of said flange 50, at which point, at each side of the recess 52, it is flared upward at the top (see points 53) and is beveled at the lower part (see bevels 54). At the point 55, at each side, at the rear of recess 52 and at the border of the central hole 56, in the flange, I place two inwardly extending fingers; these fingers are raised at their upper surface to the same plane as the raised parts 53. At one side of the hole 56, the flange is cut away at 58, to form space for the lower guide pin 65 to travel, which will be hereinafter set forth. This flange 50 has near its inner edge, adjacent to the hole 56, but somewhat larger in diameter, a downwardly extending connecting extension part 59, cut away at 60, as shown, to make room for the feed wheel or roller 46. The sleeve part 51 of the flanged sleeve, extends downwardly therefrom and is rigidly connected to the flange 50, through the medium of the extension 59 and carries a multiplicity of holes or perforations 61 for cooling the same. In this sleeve 51, I place the race way or cam race 62. In this sleeve 51, I place another sleeve 63 carrying holes or perforations 64 for cooling purposes, and this sleeve extends slightly below the other sleeve 51. At the top edge of this sleeve 63, I place an upwardly extending guide pin 65, which operates in the passage way 58, in flange 50. To the bottom edge of the sleeve 63, I connect an outwardly extending lever 66, provided with a slot 67; through this lever the sleeve 63 is oscillated as will be hereinafter described. To the sleeve 63, at one side, I place a stud 68, and cam roller 69 is loosely connected thereon; this cam roller operates in the cam race 62 in sleeve 51. This cam roller 69, operating in the cam race 62 (on account of the peculiar shape of said cam race), raises the sleeve 63 up and down and laterally or sideways, in the sleeve 51, consequently the pin 65 is raised and lowered. The edge of the leather or other material to be burnished, is guided by the pin 65, by reason of the said leather being pushed against and held against the same, thus keeping the leather in alignment and preventing its crowding inward, as the burnishing is proceeding. The guide pin 65, travels and operates as follows as the cam roller 69 is traversing the cam race 62; by pushing the lever 74 to the right, this operation of the guide pin and its supporting and connecting parts is manually accomplished. This operation of lever 74 and its connections will be more fully described hereafter. By this movement of the lever, the guide pin 65, moves or travels always in a radius with the spindle 8, moving along, at its highest position, in said radius to a predetermined point and then gradually moving downward, but still in said radius until it passes down below the feed plate 12, this course being made possible by the shape of the cam race 62 and the cam roller 69. When the lever 74 is released, after this operation, the guide pin 65 passes back over the same course, until it reaches its initial higher position.

Figure 1:
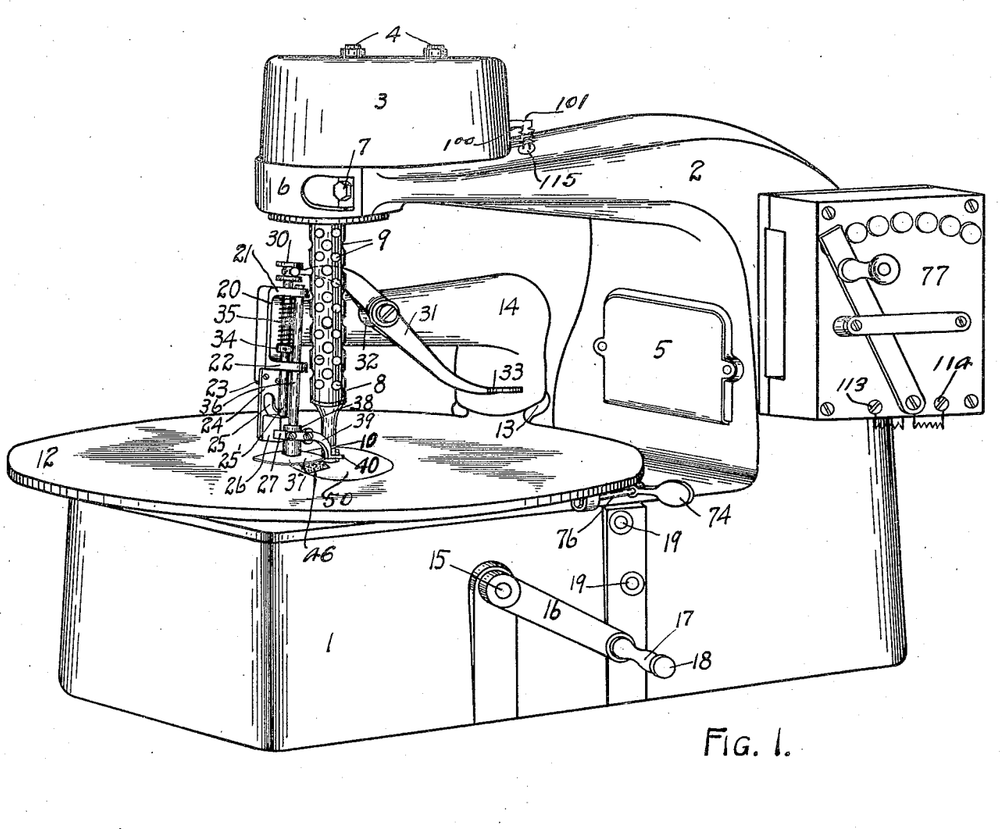
Fig. 1, is an isometric view of the machine.
Figure 2:
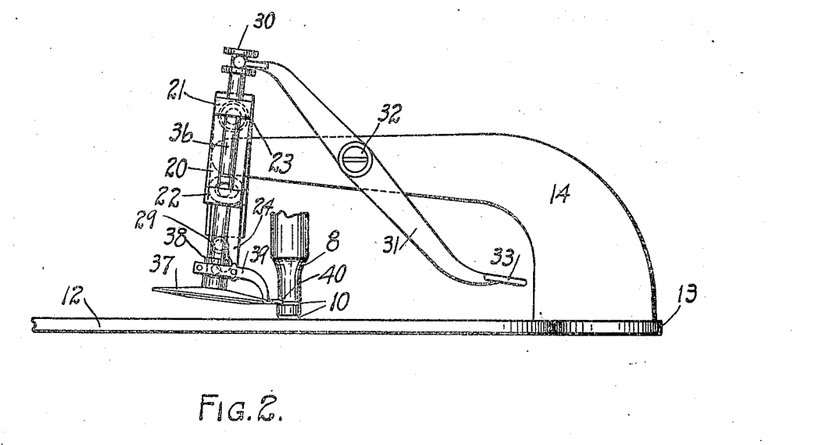
Fig. 2, is a side view of the feed plate and its connections (presser foot connections particularly), being raised out of normal position.
Figure 3:
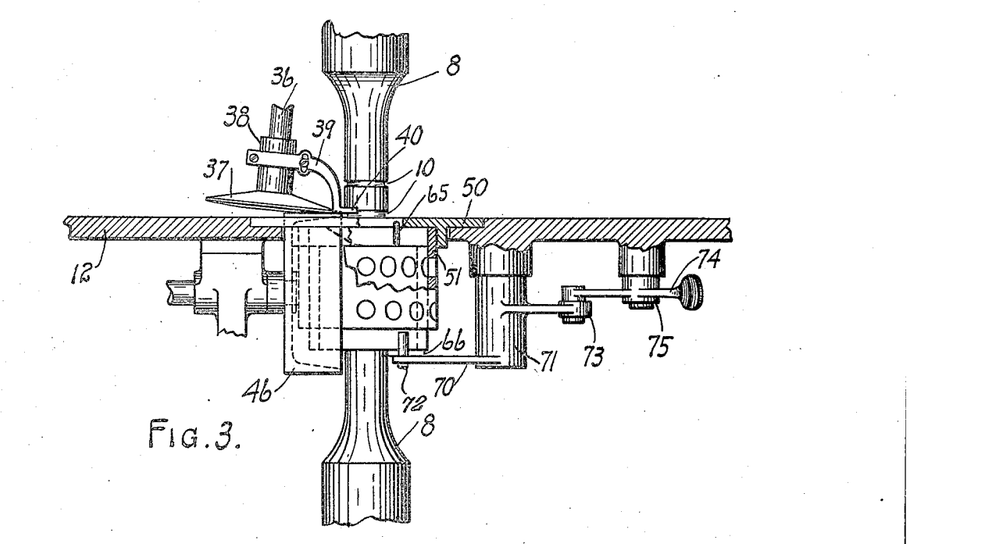
Fig. 3, is a section of plate, showing the lower feed mechanism and the lower guide means, the revolving spindle, and part of the upper feed mechanism, parts being broken away.
Figure 4:
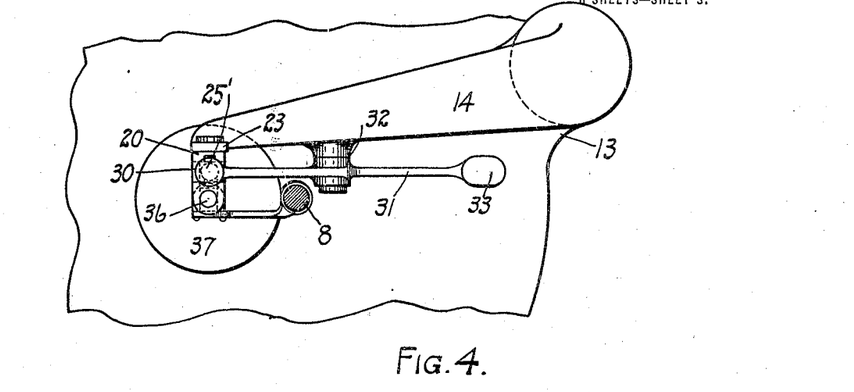
Fig. 4, is a plan view of parts shown in Fig. 2, Fig. 5, is a similar view to that shown in Fig. 2, the parts being in normal position ready for feeding.

The short lever 66, is operated by a short lever 70 fulcrumed at point 71; a stud 72 on the lever 70, operating in slot 67, in the lever 66. This lever 70 is loosely connected at point 73 to a handle lever 74, fulcrumed at 75. Pushing the handle lever 74 to the right, causes a reverse action on lever 70, this in turn, oscillates lever 66, through medium of the stud 72 moving in slot 67. These levers are thrown back into normal position by suitable spring action (not shown). The lever 74, and its connections, have a screw adjustment 76, (see Fig. 1).

In hood 3, I place the electric contact mechanism (well known in the art), which is connected to the regulating rheostat 77 by wires which run through arm 2, and more fully described as follows: At the upper end of spindle 8, I place a fiber sleeve 83, which extends upwardly to the top of the spindle, the lower end of this fiber sleeve is provided with a shoulder 84; bearing against this shoulder, and extending around the fiber sleeve is a brass contact ring 85. Bearing on the top of this brass ring 85, and also around sleeve 83, I place a fiber collar 86, and on the top of which, and around sleeve 83, is placed another brass contact ring 87; and, pressing on the top of this ring, and threaded onto the top of sleeve 83, I place a fiber nut 88, which, when screwed down, holds the above parts together. Between the brass contact rings 85 and 87, and through the fiber collar 86, and the sleeve 83, and spindle 8, and threaded in same, at opposite sides of the fixture, I place two fiber sleeves 89 and 90; these sleeves act as insulation and also lock the fixture to the steel spindle 8, towards the rear of the fixture and bearing on the brass contact rings are carbon brushes 91 and 92; these carbon brushes are held in alignment by the brush holders 93 and 94. At the rearward end of the carbon brushes, and inside the brush holders 93 and 94, I place two push springs 95 (one not shown), and at the rear end of these brush holders I thread screws 96 and 97, abutting against the back end of said springs, thus causing a tension on said springs. On the top end, near the rear end of brush holders 93 and 94, I place two terminal screws 98 and 99, which hold the terminal wires 100 and 101, which come from the rheostat 77. In the back of spindle 8 and threaded into the top of the arm 2, I place a stud 102, and around the same, and resting on the top of said arm 2, I place a fiber sleeve 103, and at the bottom of said sleeve I provide a shoulder 104; and, on the top of this shoulder and resting thereon, and around sleeve 103, I place the brush holder 94, and on this brush holder, and around said sleeve 103, I provide fiber washer or collar 105. On the top of the fiber sleeve 105, and around sleeve 103, I place the brush holder 93, and at the top of this brush holder 93, and around sleeve 103, and rising slightly above the same I place fiber collar 106, thus, when the stud 102 is screwed down, it locks all the parts together and holds them in a set position. On the lower side of the brass contact ring 87, I place a terminal screw 107, and at the top of brass contact ring 85, I place another terminal screw 108, and to these screws I attach the heating unit terminals 109 and 110; these terminals, which are attached to screws 107 and 108, pass through the insulating rings or bushes 89 and 90, and down through the steel spindle 8 and connect with the heating unit 112, (see particularly Fig. 17). These wires 100 and 101, coming from the rheostat 77, at posts 113 and 114, and passing through the arm 2 and then out of said arm at point 115, and passing through cover 3 and connecting onto terminal screws 88 and 89, on brush holders 93 and 94, transmit the current from the rheostat to the brush holders, and by reason of the carbon brushes 91 and 92, being held in brush holders 93 and 94, and resting against the brass contact rings 85 and 87, the current is transmitted through the brush holders 93 and 94, to the carbon brushes 91 and 92, and into the contact rings 85 and 87; and, by reason of the terminal screws 107 and 108, on the contact rings 85 and 87, which hold the wires 109 and 110; the current is transmitted through these wires to the heating unit 112. Inasmuch as the contact rings 85 and 87 are cylindrical in form and the spindle 8 revolves, they revolve with said spindle, and as the brushes glide against them at all times, the current is transmitted evenly and constantly to the heating unit.

I will now describe the operating mechanism of the machine; at the bottom of the spindle 8, I rigidly attach a pulley 116, and from this pulley to a point at the rear of the machine, inside of base 1, to a larger pulley 117, rigidly attached to a vertical shaft 118, I place the belt 119. The shaft 118 passes through bearings 120, and at the top of this shaft I rigidly attach a small bevel gear 121, which meshes with a larger bevel gear 122, which is rigidly attached to a shaft 123, and passes through bearing 124, and at the outer extremity of this shaft 123, I attach a pulley 125. On shaft 118, below bevel gear 121, I rigidly attach a small spur gear 126, which meshes with a larger spur gear 127, having at its top, rigidly attached, a small grooved pulley 128; the gear and pulley are fulcrumed on a stud 129, which is threaded in a projection 130, made integral with bearing 120; the bearing 120 and the bearing 124 are integral and connected by a downwardly depending arm 131. From the grooved pulley 128, to the grooved pulley 132, I connect a belt 133; the grooved pulley 132 is rigidly attached to the bottom of a vertical shaft 134, which shaft passes through a bearing 135. At the top of shaft 134, I rigidly connect a worm gear 138, which meshes with a worm wheel 137, held on a horizontal shaft 136, and passes through a bearing 139, and at the other end of shaft 138, I rigidly attach the feed wheel or roller 46. These bearings 138 and 135 are connected by an arm 140, and are screwed to the bottom of the feed plate 12.

By reason of belt (not shown), driving pulley 125, revolves the gear wheel 122, which revolves wheel 121, also revolving pulley 117, driving the belt 119, which in turn revolves the pulley 116; thus driving the spindle 8. The revolving of the gear 126 revolves gear 127, which revolves pulley 128, and drives the belt 133, which revolves pulley 132, thus driving the worm gear 136 and revolving the worm gear 137, and in this way feed wheel or roller 46 is driven.

I will now describe more fully means for raising and lowering the plate 12; in the center of shaft 15, I rigidly connect a lever 141 and at the other end of this lever I pivotally connect a link 142; this link is in a vertical position and is loosely connected at its upper end to a fork 143; said fork being rigidly connected to the bottom of feed table 12. To raise and lower the feed table 12, the operator pulls out centering pin 18 and raises the handle 17, which is connected to lever 16, which revolves the shaft 15; thus raising the lever 141, which in turn raises or pushes the link 142, connected to said fork 143; thus raising the plate 12, as the fork is attached to said plate 12; by reversing this mechanism, the plate is lowered.

In operating the machine, the feed plate 12 is raised or lowered to coincide or register with one of the grooves 10, desired for use in connection with the particular article to be burnished, as heretofore described. When the feed plate is raised or lowered, the arm 14, and the presser wheel mechanism is raised and lowered with said plate. If for instance, it is desired to burnish the edge of a vamp, or any other shoe part or any other material, it is fed in between the feed roller 46 and the presser wheel 37 against the guide pin 65, and the vamp or other article is automatically fed through, and past the spindle 8 (which is revolving at great speed), and as it is fed, passes into and through one of the peripheral grooves 10, the particular one selected, and thus the edge of said material is burnished by the heated spindle 8; the feed wheel 46 revolves slower than the spindle 8, thus allowing the heated spindle to properly and uniformly burnish the edge of the article being worked upon; during this operation the presser wheel 27 is pressing the stock or article to be burnished, by spring pressure, against the feed wheel, which carries it on; the guide foot 40 on arm 39 is holding down the edge of the stock or article worked upon to keep it from turning up or buckling when the material strikes the guide pin 65. For the convenience of the operator, I provide a lever 31, which is connected to the presser foot mechanism as heretofore set forth, so that the presser foot can be raised at any desired time for any reason and also for entering or removing the work, if desired; it need not, however, be raised to enter the material. This presser foot mechanism is, as heretofore set forth, moved by lever 31, up and down, so that, with the outward movement given thereto by the cam 29 passing over the cam race 25, the presser foot mechanism is also moved outward and inward as heretofore set forth; this movement is to keep the presser foot away from the spindle 8, otherwise, it would strike, as it is set at an angle as shown.

The guide pin 65 is operated through the medium of levers heretofore set forth, and put into operation by moving lever 74 to the right; this causes the peculiar travel of said pin 65 heretofore described, and this travel of the guide pin 65 is to keep the stock or article from crowding into any of the grooves 10; in going around short, inside curves, the pin is pulled below the face of the feed plate, out of the way, allowing the material, (at this short curve) to hug and get into the groove 10 in spindle 8.

So much of the edge, on a small inside curve, is in contact with the spindle, that it need not be guided by the pin 65. When the lever 31 is depressed, the shafts $25^1$ and 36 are raised to produce the upward and downward movement, the spring 35 producing the said downward movement; at the same time the presser foot mechanism is swinging in and out on the pivotal point 45, by reason of the cam roller 29 passing over the cam race 25, the spring 35 also operating to produce downward and inward movement of the presser wheel mechanism. In its upward movement the presser wheel 37 will remain in its normal position with relation to the spindle 8, that is, remains at the same distance therefrom, before it moves outward, so that thick and heavy material can be placed between said presser wheel and the feed roller 46.

It may be stated here, that in burnishing some articles at their edge, on account of their shape, they can be fed to the spindle 8, and properly burnished without manipulating the lever 31 or the lever 74; then again, if the articles to be burnished have a very peculiar shape, for example, have a small inside curve, the lever 74 is manipulated so that the pin 65 passes below feed plate 12; and in case heavier material is to be burnished, the lever 31 must be manipulated to move the presser wheel mechanism upward, so that the material will properly pass between the presser wheel and the feed roller or wheel 46, or when there has been an incidental stoppage or improper feeding of the material, the operator can press said lever 31 which will raise the presser wheel mechanism, giving the operator time to adjust the material or stock being operated upon, and again send it on its way; so it will be seen that manipulation of the presser wheel mechanism through the agency of said lever 31, gives the operator an opportunity for meeting any exigencies which may happen, in order to temporarily stop the feeding for any purpose.

From the above description it will be seen that the improved burnishing machine, constructed according to my invention, is of an extremely simple and inexpensive nature, and is especially well adapted for the purposes for which it is designed, and it will also be obvious from the above description that the burnishing machine is capable of considerable modification, without material departure from the principle and spirit of the invention, and for this reason I do not wish to be understood as limiting myself to the precise form and arrangement of the several parts of the device as herein set forth in carrying out my invention in practice.

What I claim as new and my invention and desire to secure by Letters Patent, is:

1. In a machine of the character described, a revolving spindle, feeding and presser foot mechanism, and a feeding plate for supporting the same, and capable of being moved upward and downward, said feeding and presser foot mechanism moving upward and downward with the plate.

2. In a machine of the character described, a revolving spindle, a feed plate, and an arm on said plate, and pressure mechanism supported by said arm, said plate capable of being moved upward and downward, carrying said arm and pressure mechanism with it.

3. In a machine of the character described, a revolving spindle, a feed plate, means for feeding the material to said spindle, and guide means for guiding the material, said guide means capable of being raised above or depressed below said feed plate.

4. In a machine of the character described, a revolving spindle, a feed plate, means for feeding material to said spindle, means for pressing against the same as it is fed, means for guiding said material along the edge, as the same is fed, said last named means capable of being raised above or below said plate, and all said means manually operated.

5. In a machine of the character described, a revolving spindle, a feed plate, said feed plate having an arm connected therewith, and presser mechanism pivotally connected to the end of said arm, said plate capable of moving upward and downward, and carrying said arm with it.

6. In a machine of the character described, a revolving spindle, an upwardly moving feed plate, means for feeding material to said spindle and manually operated means to guide the edge of said material, to keep the same from crowding against the spindle.

7. In a machine of the character described, a revolving spindle and an upwardly and downwardly moving feed plate, presser mechanism and feed mechanism, said presser mechanism capable of being swung upward and outward and downward and inward.

8. In a machine of the character described, a revolving spindle and an upwardly and downwardly moving feed plate, feeding mechanism for feeding the material to the spindle, and presser mechanism, said presser mechanism capable of being moved upward to a pre-determined point and then outward.

9. In a machine of the character described, a revolving spindle and an upwardly and downwardly moving feed plate, feeding mechanism for feeding the material to the spindle, and presser mechanism, said presser mechanism capable of being moved inward and downward.

10. In a machine of the character described, a base, an arm extending upward therefrom, a revolving spindle, said revolving spindle supported in said arm, and upwardly and downwardly moving feed plate, an arm on said feed plate, and means supported by said arm for exerting pressure on the material as the same is being fed to the spindle.

11. In a machine of the character described, a base, an arm extending upward therefrom, a revolving spindle, said revolving spindle supported in said arm, a feed plate, an arm on said feed plate, and means supported by said arm for exerting pressure on the material as the same is being fed to the spindle, said feed plate and arm and pressure mechanism capable of being raised and lowered.

12. In a machine of the character described, a burnishing element and a feed plate for supporting the material to be fed thereto, said feed plate capable of being moved upwardly and downwardly, means for feeding the material, and swinging means for exerting pressure on the material.

13. In a machine of the character described, a burnishing element and an upwardly and downwardly moving feed plate for suporting the material to be fed thereto, means for feeding the material, and swinging means for exerting pressure on the material, and means for guiding the edge of the material as it is being fed.

14. In a machine of the character described, a burnishing element and an upwardly and downwardly moving feed plate for supporting the material to be fed thereto, means for feeding the material and means for holding the same in position as the same is fed, and means for guiding the edge of the material during the feeding operation, said last named means capable of being placed into a position and out of position, but always remaining at the same distance from the burnishing element.

In testimony whereof, I affix my signature at Cincinnati, Ohio, this 18th day of September, 1919.

LOUIS J. VAN GUELPEN.